(12) United States Patent
Aldighieri et al.

(10) Patent No.: US 9,919,693 B2
(45) Date of Patent: Mar. 20, 2018

(54) REGENERATIVE BRAKING FEEDBACK DISPLAY AND METHOD

(75) Inventors: Paul Aldighieri, Grosse Pointe Farms, MI (US); Jeffrey Allen Greenberg, Ann Arbor, MI (US); David L. Watson, Ann Arbor, MI (US); Dale Gilman, Beverly Hills, MI (US); Ryan Skaff, Farmington Hills, MI (US); Dale Scott Crombez, Livonia, MI (US); Christopher Adam Ochocinski, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 1323 days.

(21) Appl. No.: 13/344,963

(22) Filed: Jan. 6, 2012

(65) Prior Publication Data
US 2012/0179347 A1   Jul. 12, 2012

Related U.S. Application Data (60) Provisional application No. 61/430,351, filed on Jan. 6, 2011.

(51) Int. Cl.
*B60T 17/00*    (2006.01)
*B60T 17/22*    (2006.01)
(Continued)

(52) U.S. Cl.
CPC .............. *B60T 17/22* (2013.01); *B60L 7/10* (2013.01); *B60L 11/1868* (2013.01); *B60T 1/10* (2013.01);
(Continued)

(58) Field of Classification Search
CPC .............................. G07C 5/00; G07C 5/0808
See application file for complete search history.

(56) References Cited

U.S. PATENT DOCUMENTS

| | | | | |
|---|---|---|---|---|
| 2,685,198 A | * | 8/1954 | Saul, Sr. ................ | G01F 9/006 116/271 |
| 4,166,382 A | * | 9/1979 | Petersen ................ | G01L 19/08 73/114.53 |

(Continued)

FOREIGN PATENT DOCUMENTS

| | | |
|---|---|---|
| JP | 2008121471 A | 5/2008 |
| WO | 2010038376 A1 | 4/2010 |
| WO | 2010046733 A1 | 4/2010 |

OTHER PUBLICATIONS

International Search Report & Written Opinion, International application No. PCT/US2012/020476, dated May 17, 2012.

(Continued)

*Primary Examiner* — Jonathan M Dager
(74) *Attorney, Agent, or Firm* — Jennifer M. Stec; Brooks Kushman P.C.

(57) ABSTRACT

Driver braking performance feedback may be conveyed to a vehicle operator as a braking efficiency score using a vehicle display system. The display system may include a vehicle display for displaying a braking efficiency indicator or gauge corresponding to the braking efficiency score. The braking efficiency score may be based on a comparison of the total regenerative braking energy recaptured during at least one braking event to a either a maximum amount of braking energy that may be recaptured during the at least one braking event or an actual total braking energy expended during the at least one braking event. The braking efficiency score may be displayed upon the completion of a braking event or upon a completion of a trip including a plurality of braking events. The display may also convey a distance corresponding to a portion of a trip distance achieved through regenerative braking.

19 Claims, 6 Drawing Sheets

(51) Int. Cl.
  *B60T 1/10* (2006.01)
  *B60W 50/00* (2006.01)
  *B60W 50/14* (2012.01)
  *B60L 7/10* (2006.01)
  *B60L 11/18* (2006.01)

(52) U.S. Cl.
  CPC ........ *B60W 50/0097* (2013.01); *B60W 50/14* (2013.01); *B60K 2350/1076* (2013.01); *B60L 2250/16* (2013.01); *B60L 2260/52* (2013.01); *B60L 2260/54* (2013.01); *B60W 2050/146* (2013.01); *B60W 2550/402* (2013.01); *Y02T 10/7005* (2013.01); *Y02T 10/7066* (2013.01); *Y02T 10/84* (2013.01)

(56) References Cited

U.S. PATENT DOCUMENTS

| | | | |
|---|---|---|---|
| 5,497,323 A | 3/1996 | McCall et al. | |
| 5,758,299 A * | 5/1998 | Sandborg | G09B 9/052 340/439 |
| 6,092,021 A * | 7/2000 | Ehlbeck | G01L 3/26 701/123 |
| 6,411,888 B1 * | 6/2002 | Weisman, II | B60W 10/06 340/439 |
| 6,453,731 B1 * | 9/2002 | Yaegashi | B60K 35/00 73/114.52 |
| 6,600,413 B1 * | 7/2003 | Lo | G07C 5/004 340/439 |
| 6,794,853 B2 * | 9/2004 | Kondo | H02J 7/0047 320/132 |
| 6,864,807 B2 * | 3/2005 | Todoriki | B60L 11/184 235/384 |
| 6,985,804 B2 * | 1/2006 | Minami | F16H 61/0213 340/439 |
| 7,024,306 B2 * | 4/2006 | Minami et al. | 701/123 |
| 7,769,499 B2 * | 8/2010 | McQuade | G07C 5/008 701/1 |
| 7,865,276 B2 * | 1/2011 | Skaff et al. | 701/22 |
| 7,898,405 B2 * | 3/2011 | Burke | G01D 11/28 180/65.21 |
| 7,933,695 B2 * | 4/2011 | Yamaguchi | B60K 6/365 180/65.29 |
| 7,996,125 B2 * | 8/2011 | Skaff et al. | 701/22 |
| 8,058,982 B2 * | 11/2011 | Crowe | B60K 6/48 340/439 |
| 8,082,774 B2 * | 12/2011 | Watson et al. | 73/114.54 |
| 8,116,971 B2 * | 2/2012 | Chen | G01C 21/3469 340/439 |
| 8,207,838 B2 * | 6/2012 | Watanabe | B60L 11/123 340/439 |
| 8,228,180 B2 * | 7/2012 | Levy | B60K 35/00 340/425.5 |
| 8,232,875 B2 * | 7/2012 | Uchida | H01M 10/42 320/104 |
| 8,248,221 B2 | 8/2012 | Crombez | |
| 8,433,473 B2 * | 4/2013 | Perkins | B60K 35/00 701/32.1 |
| 8,463,521 B2 * | 6/2013 | Westendorf | B60W 30/16 340/439 |
| 8,615,350 B2 * | 12/2013 | Goto | B60W 10/18 180/65.31 |
| 9,718,359 B2 * | 8/2017 | Crombez | B60K 35/00 |
| 2002/0171541 A1 * | 11/2002 | Crombez | B60R 16/0232 340/461 |
| 2003/0137277 A1 * | 7/2003 | Mori | G01R 31/3648 320/132 |
| 2004/0236474 A1 * | 11/2004 | Chowdhary | G06Q 30/0601 701/1 |
| 2005/0021222 A1 * | 1/2005 | Minami | G07C 5/0858 701/123 |
| 2005/0128065 A1 * | 6/2005 | Kolpasky | G09F 21/04 340/461 |
| 2005/0209771 A1 * | 9/2005 | Ishiguro | B60R 16/0236 701/123 |
| 2007/0143002 A1 * | 6/2007 | Crowell | G07C 5/004 701/123 |
| 2007/0176762 A1 * | 8/2007 | Aoyagi | B60L 11/18 340/439 |
| 2007/0203625 A1 * | 8/2007 | Quigley | F02D 41/1406 701/103 |
| 2007/0208468 A1 * | 9/2007 | Sankaran | B60K 6/445 701/31.4 |
| 2007/0247291 A1 * | 10/2007 | Masuda | F02D 11/105 340/439 |
| 2007/0295544 A1 * | 12/2007 | Borroni-Bird | B60K 35/00 180/165 |
| 2007/0296567 A1 * | 12/2007 | Tamai | B60R 16/0232 340/439 |
| 2008/0059035 A1 * | 3/2008 | Siddiqui | B60K 6/445 701/93 |
| 2008/0120175 A1 * | 5/2008 | Doering | B60R 16/0236 705/14.67 |
| 2009/0040033 A1 * | 2/2009 | Uchida | B60K 6/28 340/439 |
| 2009/0066495 A1 * | 3/2009 | Newhouse | B60W 20/00 340/439 |
| 2009/0157267 A1 * | 6/2009 | Shin | B60W 50/0098 701/51 |
| 2009/0157290 A1 * | 6/2009 | Ji | B60R 16/0236 701/123 |
| 2009/0234528 A1 * | 9/2009 | Crombez | G07C 5/004 701/31.4 |
| 2009/0322503 A1 * | 12/2009 | Suzuki | B60K 6/365 340/438 |
| 2009/0326749 A1 * | 12/2009 | Uchida | G01R 31/3679 701/22 |
| 2010/0030413 A1 * | 2/2010 | Jinno | B60K 6/445 701/22 |
| 2010/0057281 A1 * | 3/2010 | Lawyer | G01D 7/02 701/22 |
| 2010/0082190 A1 * | 4/2010 | Jinno | B60K 6/365 701/22 |
| 2010/0106352 A1 * | 4/2010 | Skaff | B60K 6/445 701/22 |
| 2010/0106353 A1 * | 4/2010 | Watson | B60K 6/365 701/22 |
| 2010/0152941 A1 * | 6/2010 | Skaff et al. | 701/22 |
| 2010/0207755 A1 * | 8/2010 | Watson | B60K 35/00 340/450.2 |
| 2010/0211240 A1 * | 8/2010 | Crombez | B60W 10/08 701/22 |
| 2010/0228459 A1 * | 9/2010 | Mizuno | B60K 35/00 701/70 |
| 2011/0023772 A1 * | 2/2011 | Crombez | B60K 6/445 116/28 R |
| 2011/0082632 A1 * | 4/2011 | Rowker | B60K 35/00 701/70 |
| 2011/0090075 A1 * | 4/2011 | Armitage | B60W 40/09 340/439 |
| 2011/0093187 A1 * | 4/2011 | Skaff et al. | 701/123 |
| 2011/0095878 A1 * | 4/2011 | Skaff | B60K 6/445 340/441 |
| 2011/0153175 A1 * | 6/2011 | Zhang | B60W 40/09 701/70 |
| 2011/0205043 A1 * | 8/2011 | Fujiki | G01D 7/00 340/439 |
| 2011/0205044 A1 * | 8/2011 | Enomoto | B60K 35/00 340/439 |
| 2011/0208381 A1 | 8/2011 | LeBrusq et al. | |
| 2011/0210838 A1 * | 9/2011 | Fujiki | G07C 5/0816 340/439 |
| 2011/0227715 A1 * | 9/2011 | Gee | B60K 6/365 340/439 |
| 2011/0241864 A1 * | 10/2011 | Fujiki | B60K 35/00 340/439 |
| 2011/0267364 A1 * | 11/2011 | Nagashima | G01D 7/00 345/592 |

(56) References Cited

U.S. PATENT DOCUMENTS

| | | | | |
|---|---|---|---|---|
| 2011/0320088 A1* | 12/2011 | Eom | B60K 35/00 | 701/34.4 |
| 2012/0078468 A1* | 3/2012 | Popp | B60K 26/021 | 701/36 |
| 2012/0078496 A1* | 3/2012 | Lindhuber | B60K 35/00 | 701/123 |
| 2012/0143410 A1 | 6/2012 | Gallagher et al. | | |
| 2012/0176231 A1* | 7/2012 | Skaff | B60K 35/00 | 340/439 |
| 2012/0179346 A1* | 7/2012 | Aldighieri | B60T 1/10 | 701/70 |
| 2012/0179395 A1* | 7/2012 | Gilman | B60L 11/1861 | 702/61 |
| 2012/0179420 A1* | 7/2012 | Gilman | B60K 35/00 | 702/165 |
| 2012/0226424 A1* | 9/2012 | Adams | F01N 3/20 | 701/93 |
| 2013/0041621 A1* | 2/2013 | Smith | B60W 50/14 | 702/142 |
| 2013/0049945 A1* | 2/2013 | Crombez | B60T 1/10 | 340/453 |
| 2013/0144501 A1* | 6/2013 | Yang | B60W 50/14 | 701/93 |
| 2013/0173128 A1* | 7/2013 | Syed | B60R 16/02 | 701/70 |

OTHER PUBLICATIONS

Office Action dated Jan. 3, 2013 in the corresponding U.S. Appl. No. 13/344,956, filed Jan. 6, 2012, pp. 1-17.

Office Action dated Jul. 15, 2013 in the corresponding U.S. Appl. No. 13/344,956, filed Jan. 6, 2012, pp. 1-14.

Non-final Office Action dated Feb. 3, 2014 in U.S. Appl. No. 13/344,956, filed Jan. 6, 2012, pp. 1-20.

* cited by examiner

REGENERATIVE BRAKING FEEDBACK DISPLAY AND METHOD

CROSS-REFERENCE TO RELATED APPLICATIONS

This application claims the benefit of U.S. provisional Application No. 61/430,351 filed Jan. 6, 2011, the disclosure of which is incorporated in its entirety by reference herein.

TECHNICAL FIELD

The present application relates to a system and method for displaying regenerative braking performance feedback.

BACKGROUND

Vehicles include a number of interfaces, such as gauges, indicators, and/or displays to convey information to the driver regarding the vehicle and its surroundings. With the advent of new technologies, such as those used in hybrid electric vehicles (HEVs), plug-in hybrid electric vehicle (PHEVs) and battery electric vehicles (BEVs), these interfaces have become more sophisticated. For example, some vehicles include battery state of charge gauges and vehicle range indicators. Also, many HEVs incorporate gauges that attempt to provide the driver with information on the various hybrid driving states. Some gauges will indicate to the driver when the vehicle is being propelled by an engine alone, a motor alone, or a combination of the two. Similarly, a display may indicate when the motor is operating as a generator, and is recharging an energy storage device, such as the battery.

It is known that some drivers may not be able to achieve desired fuel economy or energy efficiency numbers, in part because of driving habits. In many cases, drivers are willing to modify their behavior, but are unable to translate recommended techniques into real changes in their driving habits. In comparison to vehicles that rely on an internal combustion engine for locomotion, electric vehicles, such as BEVs, have limited and comparatively more variable range. Electric vehicles can also take a longer time to recharge or refuel and have relatively fewer locations at which to recharge. These can all contribute to a feeling of range anxiety. With the increase in sensing electronics, computers and other related technology on board a vehicle, the amount of information that can be communicated to the driver is virtually limitless. As new technologies increase in complexity, drivers rely on these interfaces to convey information that will help them make economical driving choices, improve vehicle performance or range, and enhance their driving experience.

Electrified vehicles, specifically vehicles with a regenerative braking system, create an opportunity for drivers to recapture energy during a braking event rather than wasting the energy as heat. Due to the design of regenerative braking systems, drivers are often uncertain about the influence of driver brake pedal input on energy recaptured. While many drivers are able to ignore this complexity, owners of electrified vehicles are often interested in maximizing their fuel efficiency or vehicle range. Because they may have limited information on how these braking systems work, drivers attempting to maximize the energy recaptured through regenerative braking may instead change their braking behavior in a manner that unintentionally minimizes the energy actually recaptured.

SUMMARY

According to one or more embodiments of the present application, a display system for a vehicle may include a vehicle display and a controller in communication with one another. The vehicle display may include a braking efficiency indicator associated with a braking efficiency score. The controller may be configured to determine an amount of regenerative braking energy captured during at least one braking event. The controller may be further configured to output the braking efficiency score based on a comparison of the amount of regenerative braking energy captured and a total braking energy value associated with the at least one braking event.

According to one or more embodiments, a braking efficiency score for each braking event may be output upon completion of each braking event. The braking efficiency indicator may convey the braking efficiency score numerically. Alternatively, the display may further include a braking efficiency gauge including the braking efficiency indicator for conveying the braking efficiency score graphically. A position of the braking efficiency indicator within the braking efficiency gauge may correspond to the braking efficiency score.

The amount of regenerative braking energy may be based on an integration of regenerative braking power during the at least one braking event. The total braking energy value may be based on an integration of total braking power during the at least one braking event. The total braking energy value may correspond to an actual total braking energy expended during the at least one braking event. Alternatively, the total braking energy value may correspond to a total recapturable braking energy value associated with the at least one braking event. The total recapturable braking energy value may be based on one or more regenerative braking power limits during the at least one braking event.

According to one or more alternate embodiments of the present application, a display system for a vehicle having an electric machine and a battery is provided. The display system may include a controller and a vehicle display in communication with one another. The controller may be configured to receive input indicative of a braking event, regenerative braking energy captured by the electric machine and stored in the battery during the braking event, and a total braking energy value associated with the braking event. The controller may be further configured to output a braking efficiency score based on a comparison of the regenerative braking energy captured and the total braking energy value upon completion of the braking event. The vehicle display may include a braking efficiency indicator corresponding to the braking efficiency score.

The braking efficiency indicator may convey the braking efficiency score numerically upon completion of the braking event. Moreover, the display may further include a braking efficiency gauge configured to convey the braking efficiency score graphically using the braking efficiency indicator. A position of the braking efficiency indicator within the braking efficiency gauge may correspond to the braking efficiency score.

The regenerative braking energy captured may be based on regenerative braking power output during the braking event. The total braking energy value may be based on a total braking power value associated with the braking event. Moreover, the total braking energy value may correspond to an actual total braking energy expended during the braking event. Alternatively, the total braking energy value may correspond to a total recapturable braking energy value associated with the braking event. The total recapturable braking energy value may be based on maximum regenerative braking power limits throughout the duration of the braking event.

According to one or more embodiments of the present application, a method for displaying braking performance feedback may include detecting a completion of a braking event, determining an amount of regenerative braking energy captured during the braking event, and displaying a braking efficiency score. The braking efficiency score may be based on a comparison of the amount of regenerative braking energy captured and a total braking energy value associated with the braking event. Moreover, the step of determining an amount of regenerative braking energy captured may include receiving input indicative of an instantaneous regenerative braking power and integrating the instantaneous regenerative braking power over a duration of the braking event. The total braking energy value may correspond to an actual total braking energy expended during the braking event. Alternatively, the total braking energy value may correspond to a total recapturable braking energy value associated with the braking event. The braking efficiency score may be displayed on a braking efficiency gauge using a braking efficiency indicator.

DETAILED DESCRIPTION

As required, detailed embodiments of the present application are disclosed herein; however, it is to be understood that the disclosed embodiments are merely exemplary of an invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ one or more embodiments of the present application.

Figure 1:
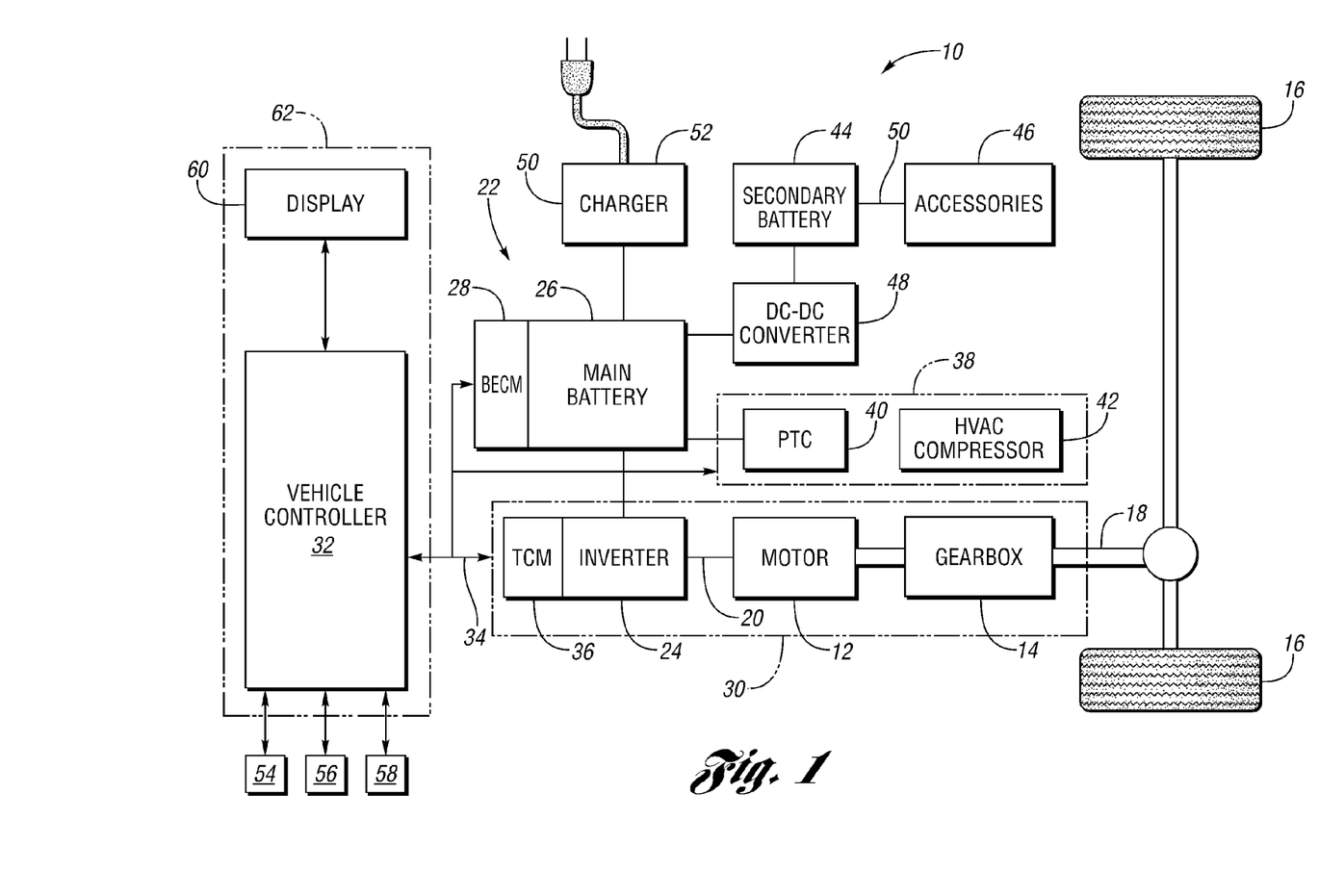
FIG. 1 is a simplified, exemplary schematic diagram of a battery electric vehicle (BEV) including a display system according to one or more embodiments of the present application.

Referring now to the drawings, FIG. 1 is a simplified, exemplary schematic diagram of a vehicle 10. The illustrated embodiment depicts the vehicle 10 as a battery electric vehicle (BEV), which is an all-electric vehicle propelled by one or more electric motors 12 without assistance from an internal combustion engine. The motor 12 may receive electrical power and provide mechanical rotational output power. The motor 12 may be mechanically connected to a gearbox 14 for adjusting the output torque and speed of the motor 12 by a predetermined gear ratio. The gearbox 14 may be connected to a set of drive wheels 16 by an output shaft 18. Other embodiments of the vehicle 10 may include multiple motors (not shown) for propelling the vehicle. The motor 12 may also function as a generator for converting mechanical power into electrical power. A high voltage bus 20 electrically connects the motor 12 to an energy storage system 22 through an inverter 24.

The energy storage system 22 may include a main battery 26 and a battery energy control module (BECM) 28. The main battery 26 may be a high voltage battery that is capable of outputting electrical power to operate the motor 12. According to one or more embodiments, the main battery 26 may be a battery pack made up of several battery modules. Each battery module may contain a plurality of battery cells. The battery cells may be air cooled using existing vehicle cabin air. The battery cells may also be heated or cooled using a battery thermal system, such as a fluid coolant system. The BECM 28 may act as a controller for the main battery 26. The BECM 28 may also include an electronic monitoring system that manages temperature and state of charge of each of the battery cells. Other embodiments of the vehicle 10 may utilize different types of energy storage systems, such as capacitors and fuel cells (not shown).

As shown in FIG. 1, the motor 12, the gearbox 14, and the inverter 24 may collectively be referred to as a transmission 30. To control the components of the transmission 30, a vehicle control system, shown generally as a vehicle controller 32, may be provided. Although it is shown as a single controller, the vehicle controller 32 may include multiple controllers that may be used to control multiple vehicle systems. For example, the vehicle controller 32 may be a vehicle system controller/powertrain control module (VSC/PCM). In this regard, the PCM portion of the VSC/PCM may be software embedded within the VSC/PCM, or it can be a separate hardware device. The vehicle controller 32 generally includes any number of microprocessors, ASICs, ICs, memory (e.g., FLASH, ROM, RAM, EPROM and/or EEPROM) and software code to co-act with one another to perform a series of operations. The vehicle controller 32 may communicate with other controllers (e.g., BECM 28) over a hardline vehicle connection 34 using a common bus protocol (e.g., CAN).

Just as the main battery 26 includes a BECM, other devices controlled by the vehicle controller 32 may have their own controllers or sub-controllers. For example, the transmission 30 may include a transmission control module (TCM) 36, configured to coordinate control of specific components within the transmission 30, such as the motor 12 and/or the inverter 24. The TCM 36 may communicate with the vehicle controller 32 over the CAN bus 34. The TCM 36 may include a motor controller for monitoring, among other things, the position, speed, power consumption and temperature of the motor 12. Using this information and a throttle command by the driver, the motor controller and the inverter 24 may convert the direct current (DC) voltage supply by the main battery 26 into signals that can be used to drive the motor 12. Some or all of these various controllers can make up a control system, which, for reference purposes, may be the vehicle controller 32. Although illustrated and described in the context of the vehicle 10, which is a BEV, it is understood that embodiments of the present application may be implemented on other types of vehicles, such as those powered by an internal combustion engine, either alone or in addition to one or more electric machines (e.g., HEVs, PHEVs, etc.).

The vehicle 10 may also include a climate control system 38 for heating and cooling various vehicle components. The climate control system 38 may include a high voltage positive temperature coefficient (PTC) electric heater 40 and a high voltage electric HVAC compressor 42. The PTC 40 may be used to heat coolant that circulates to a passenger car heater. Heat from the PTC 40 may also be circulated to the main battery 26. Both the PTC 40 and the HVAC compressor 42 may draw electrical energy directly from the main battery 26. The climate control system 38 may include a controller (not shown) for communicating with the vehicle controller 32 over the CAN bus 34. The on/off status of the climate control system 38 can be communicated to the vehicle controller 32, and can be based on, for example, the status of an operator actuated switch, or the automatic control of the climate control system 38 based on related functions such as window defrost.

In addition to the main battery 26, the vehicle 10 may include a separate, secondary battery 44, such as a typical 12-volt battery. The secondary battery 44 may be used to power various vehicle accessories, headlights, and the like (collectively referred to herein as accessories 46). A DC-to-DC converter 48 may be electrically interposed between the main battery 26 and the secondary battery 44. The DC-to-DC converter 48 may adjust, or "step down" the voltage level to allow the main battery 26 to charge the secondary battery 44. A low voltage bus 50 may electrically connect the DC-to-DC converter 48 to the secondary battery 44 and the accessories 46.

The vehicle 10 may further include an alternating current (AC) charger 52 for charging the main battery 26. The AC charger 52 may be connected to a charging port (not shown) for receiving AC power from an external power supply. The external power supply may include an adapter (e.g., a plug) for connecting to the charging port at the vehicle's exterior. The external power supply itself may be connected to an electrical power grid. The AC charger 52 may include power electronics used to convert, or "rectify" the AC power received from the external power supply to DC power for charging the main battery 26. The AC charger 52 may be configured to accommodate one or more conventional voltage sources from the external power supply (e.g., 110 volt, 220 volt, etc.).

Also shown in FIG. 1 are simplified schematic representations of a braking system 54, an acceleration system 56, and a navigation system 58. The braking system 54 may include a brake pedal, position sensors, pressure sensors, or some combination thereof, as well as a mechanical connection to the vehicle wheels, such as the primary drive wheels 16, to effect friction braking. The braking system 54 may also be configured for regenerative braking, wherein braking energy may be captured and stored as electrical energy in the main battery 26. The acceleration system 56 may include an accelerator pedal having one or more sensors, which, like the sensors in the braking system 54, may communicate information such as throttle input to the vehicle controller 32. The navigation system 58 may include a navigation display, a global positioning system (GPS) unit, a navigation controller and inputs for receiving destination information or other data from a driver. These components may be unique to the navigation system 58 or shared with other systems. The navigation system may also communicate distance and/or location information associated with the vehicle 10, its target destinations, charge point locations, or other relevant GPS waypoints. The vehicle controller 32 may communicate with each individual vehicle system to monitor and control vehicle operation according to programmed algorithms and control logic. In this regard, the vehicle controller 32 may help manage the different energy sources available and the mechanical power being delivered to the wheels 16 in order to maximize the vehicle's range.

In addition to the foregoing, the vehicle 10 may include a display 60 to facilitate communications with a driver. The display 60 may include associated circuitry, including hardware and/or software, necessary to communicate with the vehicle controller 32 and operate the display 60 to provide relevant vehicle content to a driver of the vehicle 10. The vehicle controller 32 may be configured to receive input signals that are indicative of current operating and environmental conditions of the vehicle 10. For instance, the vehicle controller 32 may receive input signals from the BECM 28, the transmission 30 (e.g., motor 12 and/or inverter 24), the climate control system 38, the braking system 54, the acceleration system 56, the navigation system 58, or the like. The vehicle controller 32 may provide output to the display 60 such that the display 60 conveys driving efficiency information or other information relating to the operation of the vehicle 10 to the driver, such a regenerative braking performance feedback. The vehicle controller 32 and the display 60 may form a display control system 62 for providing drivers with relevant vehicle content and driving behavior feedback.

The display 60 may be disposed within a dashboard (not shown) of the vehicle 10, such as in an instrument panel or center console area. Moreover, the display 60 may be part of another display system, such as a navigation display system, or may be part of a dedicated information display system. The display 60 may be a liquid crystal display (LCD), a plasma display, an organic light emitting display (OLED), or any other suitable display. The display 60 may include a touch screen for receiving driver input associated with selected areas of the display 60. The display control system 62 may also include one or more buttons (not shown), including hard keys or soft keys, located adjacent the display 60 for effectuating driver input. Other operator inputs known to one of ordinary skill in the art may also be employed without departing from the scope of the present application.

According to one or more embodiments of the present application, the display 60 may be a graphical display providing feedback about the performance of the regenerative braking system. In particular, the display 60 may provide performance feedback on the driver's braking behavior or regenerative braking efficiency. The display of regenerative braking performance feedback may allow drivers to safely experiment with different braking behavior while getting accurate feedback about the energy recaptured. Moreover, the display may allow drivers that are interested in improving their vehicle efficiency to appropriately modify their braking behavior.

There are several different alternative ways of displaying this type of feedback to the driver. According to one or more embodiments of the present application, absolute information about the amount of energy captured as electricity and the amount of energy released as heat by the friction braking system may be conveyed. In this manner, drivers may be provided the raw information need to compare different braking events. According to one or more alternative embodiments, these two pieces of information may be combined and the feedback displayed as a percentage. For instance, the display 60 may indicate the percentage of the braking energy that was captured as electricity and stored in the main battery 26, as compared to a total braking energy produced including braking energy lost as heat in the friction braking system. This alternative may provide a simpler metric, allowing the driver to attempt to maximize their percentage. Alternatively, the display may convey a percentage of captured energy through regenerative braking relative to some calculated maximum. In this regard, the vehicle controller 32 may determine a maximum amount of energy that may be captured based on current vehicle operating or environmental conditions (e.g., the vehicle speed, battery state of charge, battery temperature, etc.). By comparing the driver's braking performance relative to an ideal goal, the driver may be more likely to be able to get a perfect "score" from the display 60.

In addition, the display 60 may provide feedback after the vehicle 10 has stopped or completed a braking event. By providing feedback from the previous braking event, driver distraction may be minimized and the driver may be better able to understand the information when the driving task is less demanding (e.g., when the vehicle is stopped). According to one or more embodiments, the driver may be able to dismiss the braking feedback report from the display 60 upon pressing the accelerator pedal, or by pressing a button on the steering column or instrument panel. Upon doing so the, the braking event feedback may be artfully dismissed from the display 60 in a manner that reinforces the positive impact of efficient braking on fuel efficiency or vehicle range. For instance, the brake event feedback dismissal may include an animation showing the braking energy recaptured through regenerative braking flowing into a battery state of charge (SOC) gauge.

Figure 2:
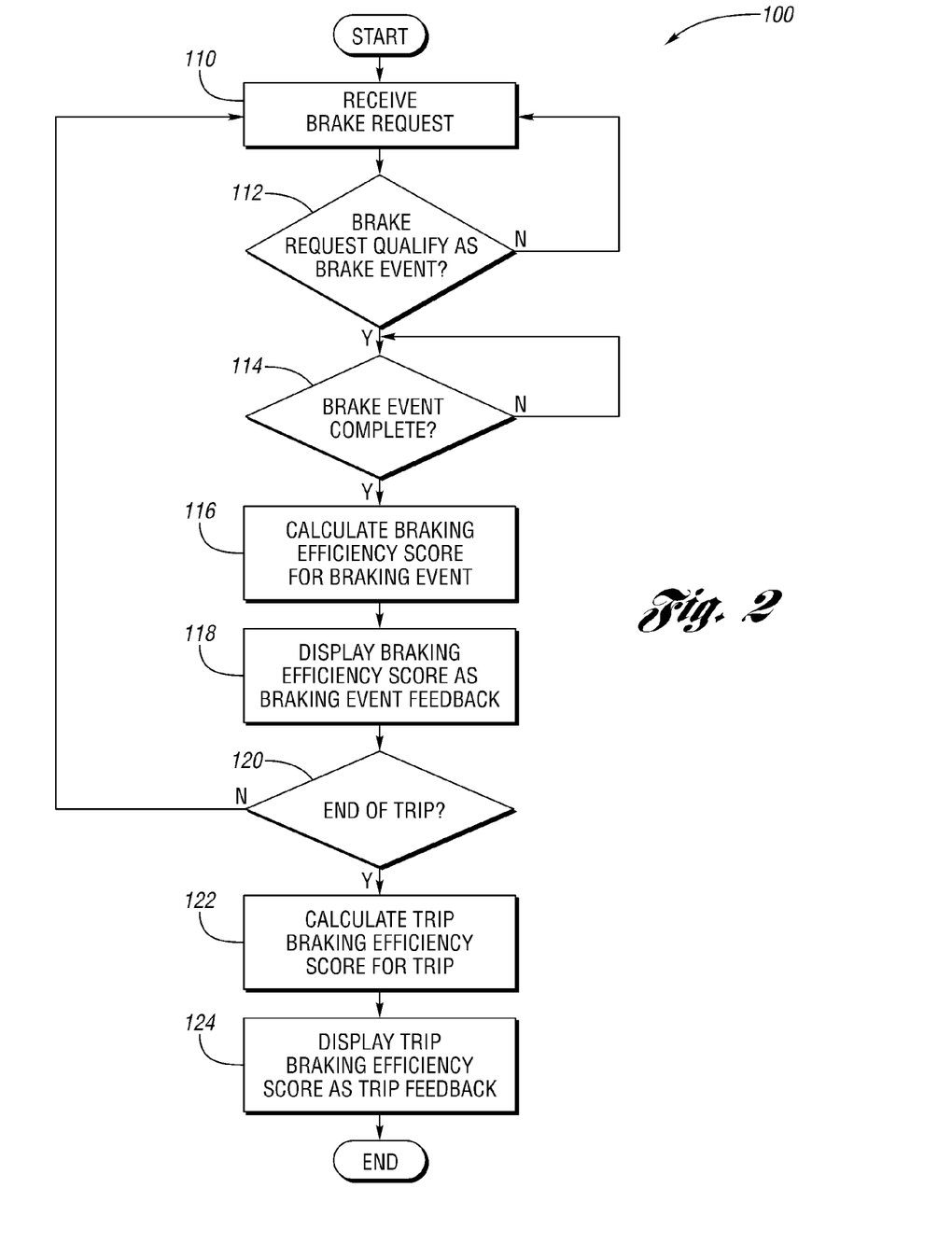
FIG. 2 is a simplified, exemplary flow diagram depicting a method for displaying driver braking performance feedback according to one or more embodiments of the present application.

Referring now to FIG. 2, a simplified, exemplary flowchart illustrating a method 100 for displaying regenerative braking feedback according to one or more embodiments of the present application is provided. As those of ordinary skill in the art will understand, the functions represented by the flowchart may be performed by hardware and/or software. Depending on the particular processing strategy, such as event driven, interrupt driven, etc., the various functions may be performed in an order or sequence other than that illustrated in FIG. 2. Likewise, one or more steps or functions may be repeatedly performed although not explicitly illustrated. Similarly, one or more of the steps or functions illustrated may be omitted in some applications or implementations. According to one or more embodiments, the functions illustrated are primarily implemented by software instructions, code, or control logic stored in a computer-readable storage medium and executed by a microprocessor based computer or controller to control operation of the vehicle, such as the vehicle controller 32 illustrated in FIG. 1.

Initially, the vehicle controller 32 may receive input indicative of a braking request, as represented by block 110. The braking request may include any driver request to brake the vehicle 10. For instance, a driver braking request may include releasing the accelerator pedal during gradual or lower torque braking or depressing the brake pedal for requesting greater braking torque. In response to the braking request, the vehicle controller 32 may determine whether the braking request qualifies as a braking event for purposes of providing the regenerative braking feedback, as represented by block 112. A braking request may qualify as a braking event if certain braking event feedback conditions are met. For example, a braking request may qualify as a braking event for feedback purposes when the transmission 30 is in a forward gear, the vehicle speed is below a predetermined vehicle speed braking event threshold, and/or the brake pedal is being applied. Moreover, if the braking request is minimal or for a very duration, the braking request may not trigger a braking event. If a braking request does not qualify as a braking event, the vehicle controller 32 may not output any braking feedback signals and the display 60 may not convey any braking feedback. The method may return to block 110 to continue to monitor future braking requests.

If, however, the braking request qualifies as a braking event for feedback display purposes, the vehicle controller 32 may then determine if the braking event has been completed, as represented by block 114. According to one or more embodiments of the present application, braking performance feedback may be conveyed upon the completion of a braking event to minimize driver distraction. Accordingly, the vehicle controller 32 may monitor braking conditions to determine if the braking event is still in progress for feedback display purposes. For example, a braking event may still be in progress when the wheel torque is negative and the vehicle speed is greater than the vehicle speed at the start of the braking event. As another example, the braking event may still be in progress if the brake pedal is being applied, the braking event was previously in progress, and wheel torque is less than a threshold value. Alternatively, the braking event may still be in progress if the brake pedal is being applied, the braking event was previously in progress, and the vehicle speed is relatively low. Further, the braking event may still be in progress if the braking event was previously in progress for less than a threshold amount of time. Accordingly, a braking event may continue even if the driver briefly releases the brake pedal. If the braking event is still in progress, the method may loop back to block 114 and the vehicle controller 32 may continue to monitor for the braking event conditions to determine if the braking event has been completed for feedback display purposes.

Once the braking event has been completed, the vehicle controller 32 may calculate a braking efficiency score corresponding to the braking event, as represented by block 116. The process for determining the braking efficiency score will be discussed in more detail below. Once the braking efficiency score has been calculated, the vehicle controller 32 may output a display signal indicative of the braking efficiency score to the display 60. The display 60 may convey the braking efficiency score as braking event feedback in response to the display signal, as represented by block 118.

The vehicle controller 32 may continue to monitor for qualifying braking events over the course of a vehicle trip, as represented by block 120. As used herein, a vehicle trip may correspond to a vehicle ON/OFF cycle, such as an ignition cycle or a key cycle. Thus, the vehicle trip may be concluded upon vehicle shutdown. However, a conclusion to the vehicle trip may be triggered when the transmission is placed in a parking gear, for example, rather than vehicle shutdown. Additionally, it is also contemplated that the vehicle trip may correspond to other durations (e.g., the time between vehicle recharging or refueling events, manual trip resets, etc.). At the end of a trip, the vehicle controller 32 may calculate a trip braking efficiency score, as represented by block 122. The process for determining the trip braking efficiency score will be discussed in more detail below. Once the trip braking efficiency score is computed, the vehicle controller 32 may output a display signal indicative of the trip braking efficiency score to the display 60. The display 60 may convey the trip braking efficiency score as braking feedback for the trip in response to the display signal, as represented by block 124.

Figure 3:
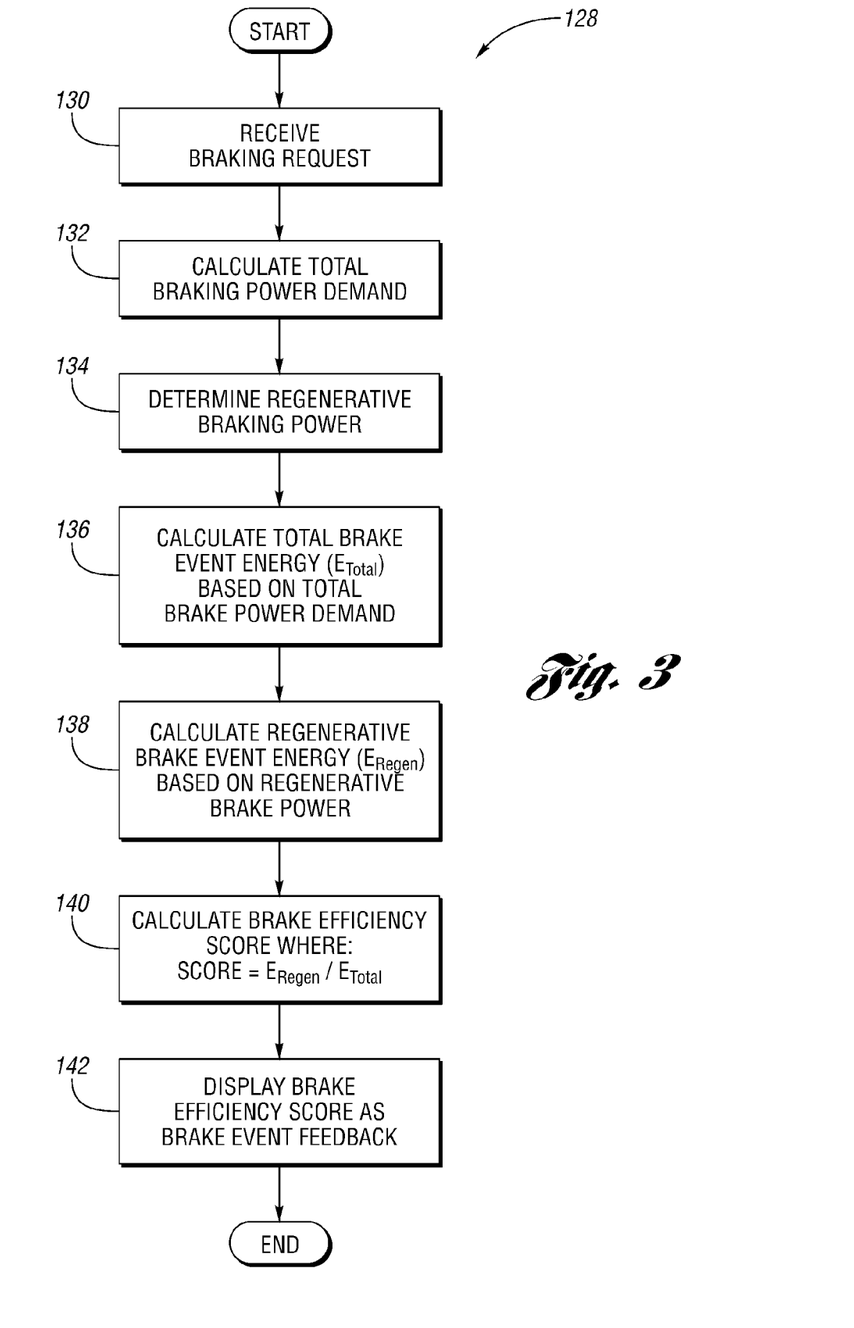
FIG. 3 is a simplified, exemplary flow diagram depicting a method for displaying a braking efficiency score according to one or more embodiments of the present application.

FIG. 3 is a simplified, exemplary flowchart illustrating a method 128 for determining a braking efficiency score according to one or more embodiments of the application. The vehicle controller 32 may receive input corresponding to a driver braking request or demand for a qualifying braking event, as represented by block 130. According to one or more embodiments, the braking demand may correspond to a driver requested braking torque. Accordingly, the braking demand may be limited to only negative values, such as negative torque.

The vehicle controller 32 may calculate a total braking power value, as represented by block 132. The total braking power value may be calculated as an actual total braking power demand based on the requested braking torque and the vehicle speed. The total braking power demanded may be the sum of any powertrain braking power and friction braking power. The powertrain braking power may include regenerative braking power from the regenerative brake system. In a BEV, the powertrain braking power may be provided by only an electric machine. However, in a HEV, powertrain braking may be provided by a combination of the engine, transmission and electric machine. Alternatively, the total braking power value may be clipped to account for normal regenerative braking power limits. The normal regenerative braking power limit may be the minimum of the normal battery charge limit. The normal regenerative braking power limit may also be based on other system limitations that impacts regenerative braking such as normal brake stability control limits or normal motor limitations. For example, the normal regenerative braking power limit may be based on a regenerative braking system within functional temperature operation ranges (e.g., approximately 70° F.) on dry road conditions, with non-faulted components, and with new brake pads.

The vehicle controller 32 may determine the regenerative braking power, as represented by block 134. The regenerative braking power may be calculated based on a regenerative braking torque and the vehicle speed. The regenerative braking power may be a calculation of actual regenerative braking torque multiplied by the vehicle speed. Alternatively, the regenerative braking power may be calculated to account for normal regenerative braking limits. For example, all braking power below the normal regenerative braking power limit may be assumed to be recovered in regenerative braking for feedback display purposes.

Based on the total braking power, the vehicle controller 32 may calculate total brake event energy value, as represented by block 136. The brake energy corresponds to power in the time domain. Therefore, total brake event energy may be calculated by integrating the total braking power over the duration of the braking event. According to one or more embodiments, the total braking energy value may correspond to an actual total braking energy expended during the braking event. Alternatively, the total braking energy value may correspond to a total recapturable braking energy value associated with the braking event in order to account for the normal regenerative braking system limits.

Based on the regenerative braking power, the vehicle controller 32 may calculate regenerative braking energy, as represented by block 138. The regenerative braking energy may be calculated the same as the total braking energy, in which braking energy corresponds to braking power in the time domain. Therefore, the regenerative braking energy may be calculated by integrating the regenerative braking power over the duration of the braking event.

The controller may then calculate the braking efficiency score, as represented by block 140. The braking efficiency score may be based on a comparison of the regenerative braking energy to the total braking energy value. Accordingly, the braking efficiency score may be calculated by dividing the regenerative braking energy by the total braking event energy. As noted above, the total braking event energy may be the actual total braking energy expended during the braking event, or may correspond to a total recapturable braking energy value based on the normal regenerative braking system limits. The vehicle controller 32 may then provide a display signal to the display 60 to display the braking efficiency score as brake event feedback, as represented by block 142.

The calculation for the trip braking efficiency score may use the same method or algorithm explained above and illustrated in FIG. 3. For calculating the trip braking efficiency score, the total braking energy value and regenerative braking energy recaptured for each braking event over the duration of the vehicle trip is summed. A long-term braking efficiency score may also be similarly calculated. In order to calculate a long-term braking efficiency score, the sum of the regenerative braking energy and total braking energy over multiple vehicle trips may be determined. For instance, the current trip sum of regenerative braking energy may be added to the previous long-term sum of regenerative braking energy to obtain a new sum of long-term regenerative braking energy. Similarly, the current trip sum of total braking energy may be added to the previous long-term sum of total braking energy to obtain a new sum of long-term total braking energy. The trip braking efficiency score and the long-term braking efficiency score may be reset to zero when level counters are reset to zero. The trip level counters may be set to zero at the end of the vehicle trip. The long-term level counters may be set to zero upon a manual rest (e.g., by a driver). It is also contemplated that the trip braking efficiency score and the long-term braking efficiency score may be personalized based on the driver. For example, if the vehicle 10 includes personalization identification, ignition key ID, or other method of detecting one driver from another (i.e., driver 1, driver 2, etc.), the trip braking efficiency score and the long-term braking efficiency score may be tracked based on a particular driver.

Figure 4:
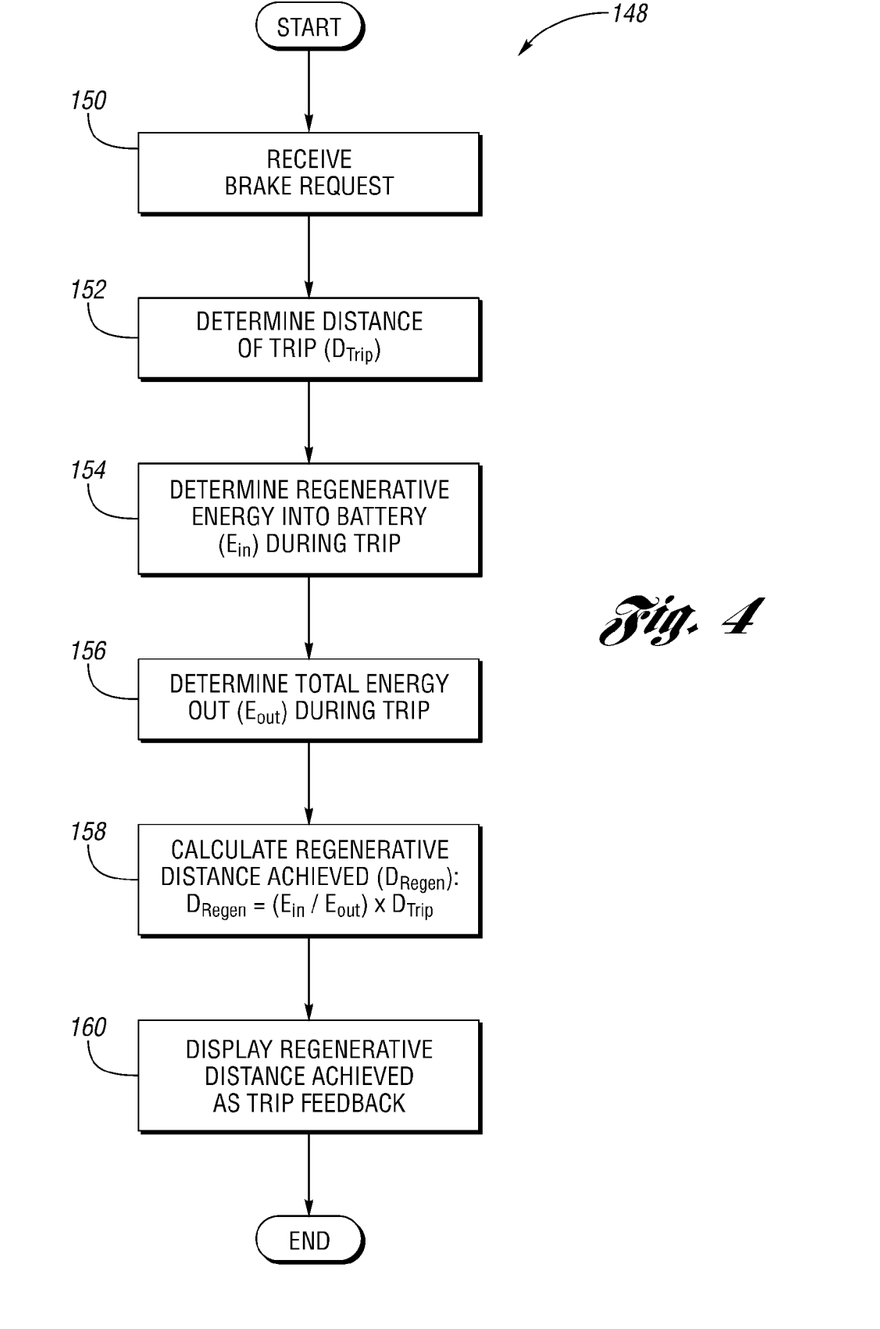
FIG. 4 is a simplified, exemplary flow diagram depicting a method for displaying a distance achieved through regenerative braking according to one or more embodiments of the present application.

FIG. 4 is a simplified, exemplary flowchart illustrating a method 148 for determining and displaying additional trip feedback according to one or more embodiments of the application. The vehicle controller 32 may receive a braking request, as represented by block 150. Moreover, the vehicle controller 32 may receive input indicative of a trip distance, as represented by block 152. For example, the trip distance may correspond to an odometer distance for the vehicle trip. The vehicle controller 32 may determine the amount of recaptured regenerative braking energy into the main battery 26 during the trip, as represented by block 154. The regenerative braking energy into the main battery 26 may be monitored by the BECM 28, for example. The vehicle controller 32 may further determine the total output energy for operating the vehicle 10 during the trip, as represented by block 156. In a BEV, the total energy out may correspond to a total energy value output by the main battery 26 in order to propel the vehicle 10 for the trip. For an HEV, the total energy out may also incorporate output engine power integrated over the trip duration.

As shown in block 158, a regenerative distance achieved value corresponding to the trip may be calculated based on the total energy in and the total energy out. For instance, the regenerative distance achieved may be based on a ratio of the energy in to the energy out multiplied by the distance of the trip. The vehicle controller 32 may then provide a display signal to the display 60 causing the display 60 to display the regenerative distance achieved as trip braking feedback, as represented by block 160.

Figure 5:
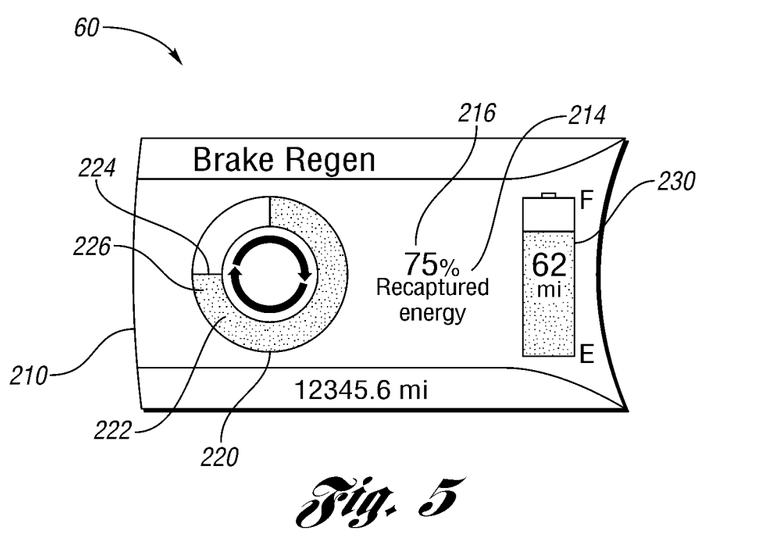
FIG. 5 illustrates an exemplary vehicle display according to one or more embodiments of the present application.

Turning now to FIGS. 5 through 8, various exemplary display screens that may be displayed by the display 60 in response to display signals received from the vehicle controller 32 are provided, in accordance with one or more embodiments of the present application. The various exemplary display screens may provide a driver with braking behavior feedback. FIG. 5 depicts an exemplary brake event feedback screen 210. The brake event feedback screen 210 may include a braking efficiency indicator 214. As shown, braking efficiency indicator 214 may be a digital readout for displaying the braking efficiency score 216 alphanumerically. The brake event feedback screen 210 may also include a braking efficiency gauge 220. The braking efficiency gauge 220 may convey the braking efficiency score graphically. As shown in FIG. 5, the braking efficiency gauge 220 may include a circular ring 222 and a status bar 224. The status bar 224 may moves within the circular ring 222 to define a regenerative braking portion 226 in relation to the total braking amount. The location of the status bar 224 and the size of the regenerative braking portion 226 within the circular ring 222 may correspond to the braking efficiency score. The brake event feedback screen 210 may also include a state of charge indicator 230 graphically illustrating the amount of energy stored in the main battery 26. It is contemplated that the braking efficiency indicator 214 may be graphically connected to the state of charge indicator 230 in order to provide additional feedback during regenerative braking.

Figure 6:
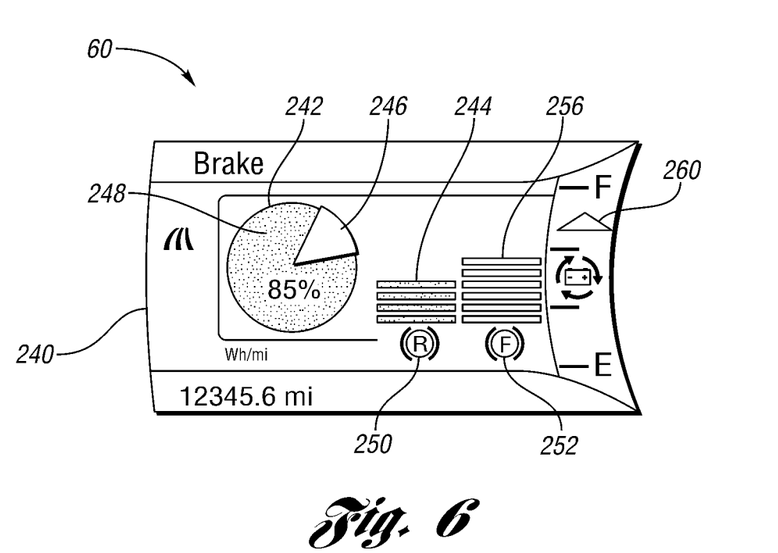
FIG. 6 illustrates another exemplary vehicle display according to one or more embodiments of the present application.

FIG. 6 illustrates a brake summary screen 240 according to one or more embodiments of the present application. The brake summary screen 240 may include a trip average braking gauge 242 and a brake event distribution gauge 244. The trip average braking gauge 242 may convey the trip braking efficiency score graphically. As shown in FIG. 6, the trip average braking gauge 242 may illustrate the trip braking score in a pie chart 246. The pie chart 246 may include a regenerative braking portion 248 corresponding to the trip braking efficiency score. The brake event distribution gauge 244 may display the braking efficiency score for each braking event graphically. The brake event distribution gauge 244 may be illustrated as a bar chart having a regenerative braking portion 250 and a friction braking portion 252. The regenerative braking portion 250 and the friction braking portion 252 may include more or less bars 256 to graphically illustrate the amount of regenerative braking compared to friction braking, respectively. The brake summary screen 240 may also include a state of charge indicator, similar to that described above with reference to FIG. 5.

Figure 7:
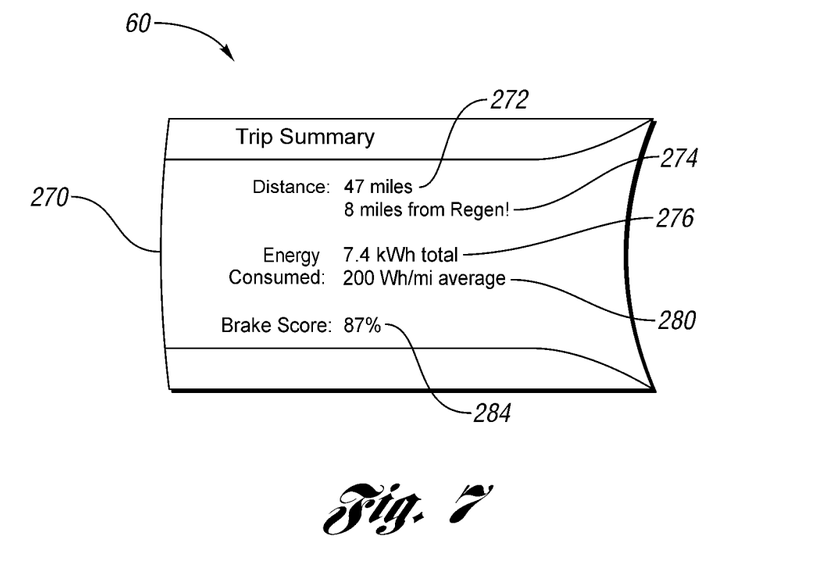
FIG. 7 illustrates yet another vehicle display according to one or more alternate embodiments of the present application.

FIG. 7 illustrates an exemplary trip summary screen 270. The trip summary screen 270 may include a trip distance indicator 272. The trip distance indicator 272 may display the trip distance in a digital or alphanumeric readout, similar to an odometer. The trip summary screen 270 may also include a regenerative distance achieved indicator 274. The regenerative distance achieved indicator 274 may display the regenerative distance achieved value. The regenerative distance achieved value may correspond to a portion of the trip distance achieved through regenerative braking. The regenerative distance achieved indicator 274 displays the regenerative distance achieved in a digital or alphanumeric readout, as shown. It is also contemplated that the regenerative distance achieved indicator 274 may be a graphical gauge similar to or in combination with a state of charge indicator for graphically displaying the regenerative distance achieved.

The trip summary screen 270 may also include an energy consumption indicator 276 and an energy consumption rate indicator 280. The trip summary screen 270 may also include a trip braking efficiency score indicator 284. As illustrated in FIG. 7, the trip braking efficiency score indicator 284 may display the trip braking efficiency score in a digital or alphanumeric readout. It is also contemplated that the trip braking efficiency score may be displayed as a graphical gauge, such as the trip braking efficiency gauge 242 shown in FIG. 6.

Figure 8:
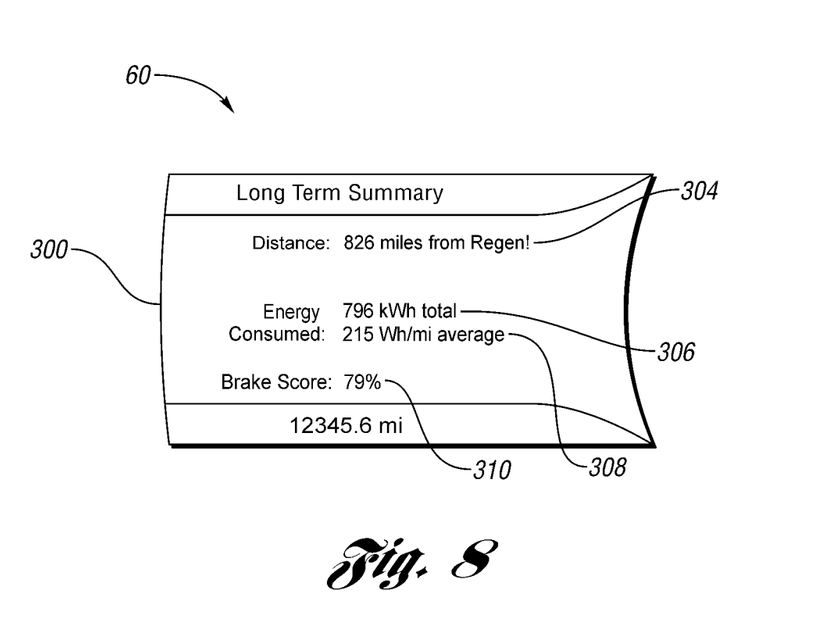
FIG. 8 illustrates still another vehicle display according to one or more embodiments of the present application.

FIG. 8 illustrates an exemplary long-term summary screen 300. The long-term summary screen may include a long-term regenerative distance achieved indicator 304. The long-term summary screen 300 may also include a long-term energy consumption indicator 306 and a long-term energy consumption rate indicator 308. As shown in FIG. 8, the long-term energy consumption indicator 306 may display the total long-term energy consumed by the vehicle 10. The long-term energy consumption rate indicator 308 may display a long-term energy consumption rate in terms of energy per unit distance. The long-term summary screen 300 may also include a long-term braking efficiency score indicator 310. As illustrated in FIG. 8, the long-term braking efficiency score indicator 310 may display the long-term braking efficiency score numerically. However, it is also contemplated that the long-term braking efficiency score may be displayed using a graphical gauge, as discussed above.

According to one or more embodiments, the trip summary screen 270 and the long-term summary screen 300 may be displayed on the display 60 as a shutdown screen during a vehicle shutdown sequence or as an overlay screen over the brake event feedback screen. As an overlay, the trip summary screen 270 or long term summary screen 300 may be used to compare the most recent brake event feedback to the last trip average or a long-term average.

While various embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A display system comprising:
a display including a braking efficiency indicator associated with a braking efficiency score; and
a controller configured to:
determine an amount of regenerative braking energy captured during a braking request; and
output the braking efficiency score based on a comparison of the amount of regenerative braking energy captured and a total braking energy value associated with the braking request when vehicle speed drops below a threshold.

2. The display system of claim 1, wherein the braking efficiency indicator conveys the braking efficiency score numerically.

3. The display system of claim 1, wherein the display further includes a braking efficiency gauge including the braking efficiency indicator for conveying the braking efficiency score graphically, wherein a position of the braking efficiency indicator within the braking efficiency gauge corresponds to the braking efficiency score.

4. The display system of claim 1, wherein the amount of regenerative braking energy is based on an integration of regenerative braking power during the braking request and the total braking energy value is based on an integration of total braking power during the braking request.

5. The display system of claim 1, wherein the total braking energy value corresponds to an actual total braking energy expended during the braking request.

6. The display system of claim 1, wherein the total braking energy value corresponds to a total recapturable braking energy value associated with the braking request.

7. The display system of claim 6, wherein the total recapturable braking energy value is based on a regenerative braking power limit during the braking request.

8. A display system for a vehicle having an electric machine and a battery, the display system comprising:
   a controller configured to:
      receive input indicative of a braking request, regenerative braking energy captured by the electric machine and stored in the battery during the braking request and a total braking energy value associated with the braking request, and
      output a braking efficiency score based on a comparison of the regenerative braking energy captured and the total braking energy value when vehicle speed drops below a threshold; and
   a vehicle display, in communication with the controller, including a braking efficiency indicator corresponding to the braking efficiency score.

9. The display system of claim 8, wherein the braking efficiency indicator conveys the braking efficiency score numerically.

10. The display system of claim 8, wherein the display further includes a braking efficiency gauge configured to convey the braking efficiency score graphically using the braking efficiency indicator, wherein a position of the braking efficiency indicator within the braking efficiency gauge corresponds to the braking efficiency score.

11. The display system of claim 8, wherein the regenerative braking energy captured is based on regenerative braking power output during the braking request and the total braking energy value is based on a total braking power value associated with the braking request.

12. The display system of claim 8, wherein the total braking energy value corresponds to an actual total braking energy expended during the braking request.

13. The display system of claim 8, wherein the total braking energy value corresponds to a total recapturable braking energy value associated with the braking request.

14. The display system of claim 13, wherein the total recapturable braking energy value is based on maximum regenerative braking power limits throughout a duration of the braking request.

15. A display method comprising:
   determining an amount of regenerative braking energy captured during a braking request; and
   displaying a braking efficiency score based on a comparison of the amount of regenerative braking energy captured and a total braking energy value associated with the braking request only when vehicle speed drops below a threshold.

16. The display method of claim 15, wherein the step of determining an amount of regenerative braking energy captured comprises:
   receiving input indicative of an instantaneous regenerative braking power; and
   integrating the instantaneous regenerative braking power over a duration of the braking request.

17. The display method of claim 15, wherein the total braking energy value corresponds to an actual total braking energy expended during the braking request.

18. The display method of claim 15, wherein the total braking energy value corresponds to a total recapturable braking energy value associated with the braking request.

19. The display method of claim 15, wherein the braking efficiency score is displayed on a braking efficiency gauge using a braking efficiency indicator.

* * * * *